United States Patent
Komemushi et al.

(10) Patent No.: US 10,117,424 B2
(45) Date of Patent: Nov. 6, 2018

(54) SPOOL BRAKE DEVICE FOR DUAL-BEARING REEL

(71) Applicant: Shimano Inc., Sakai, Osaka (JP)

(72) Inventors: Takashi Komemushi, Osaka (JP); Yuichiro Ishikawa, Osaka (JP); Akira Niitsuma, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 310 days.

(21) Appl. No.: 15/265,537

(22) Filed: Sep. 14, 2016

(65) Prior Publication Data

US 2017/0172130 A1 Jun. 22, 2017

(30) Foreign Application Priority Data

Dec. 18, 2015 (JP) ................. 2015-247058

(51) Int. Cl.
| | |
|---|---|
| *A01K 89/01* | (2006.01) |
| *A01K 89/0155* | (2006.01) |
| *G01P 3/44* | (2006.01) |
| *G01P 3/486* | (2006.01) |
| *G01P 3/487* | (2006.01) |
| *G01P 15/16* | (2013.01) |

(52) U.S. Cl.
CPC .. *A01K 89/01557* (2015.05); *A01K 89/01555* (2013.01); *G01P 3/44* (2013.01); *G01P 3/486* (2013.01); *G01P 3/487* (2013.01); *G01P 15/165* (2013.01)

(58) Field of Classification Search
CPC ........ A01K 89/01555; A01K 89/01931; A01K 89/045; G01P 3/44; G01P 3/487; G01P 15/165
See application file for complete search history.

(56) References Cited

U.S. PATENT DOCUMENTS

| | | | | |
|---|---|---|---|---|
| 5,749,533 A | * | 5/1998 | Daniels | A01K 89/01555 188/268 |
| 6,045,076 A | * | 4/2000 | Daniels | A01K 89/01555 188/268 |
| 6,412,722 B1 | * | 7/2002 | Kreuser | A01K 89/01555 242/288 |
| 10,039,272 B2 | * | 8/2018 | Komemushi | A01K 89/01555 |
| 2008/0017739 A1 | * | 1/2008 | Beckham | A01K 89/0155 242/288 |
| 2009/0095835 A1 | * | 4/2009 | Beckham | A01K 89/0155 242/286 |

FOREIGN PATENT DOCUMENTS

JP H10327722 A 12/1998

* cited by examiner

*Primary Examiner* — Emmanuel M Marcelo
(74) *Attorney, Agent, or Firm* — United IP Counselors, LLC

(57) ABSTRACT

A spool brake device for a fishing reel includes an electric spool brake, a rotation detector, and a controller. The rotation detector detects a rotation of the spool. The controller calculates a rotational velocity of the spool based on the rotation of the spool, determines whether the fishing reel is in a casting state based on the rotational velocity, controls the spool brake to brake the spool upon a determination that the fishing reel is in the casting state, and controls the spool brake to not brake the spool upon a determination that the fishing reel is not in the casting state.

20 Claims, 10 Drawing Sheets

SPOOL BRAKE DEVICE FOR DUAL-BEARING REEL

CROSS-REFERENCE TO RELATED APPLICATIONS

This application claims priority to Japanese Patent Application No. 2015-247058 filed on Dec. 18, 2015, the entirety of which is hereby incorporated by reference in its entirety.

BACKGROUND

Technical Field

The present disclosure relates to a spool brake device for a dual-bearing reel, and particularly to a spool brake device that brakes a spool of a dual-bearing reel in an electrically controllable manner.

Background Information

To prevent occurrence of a backlash during a casting, some dual-bearing reels used for casting are provided with a spool brake device for braking a spool. Such a well-known spool brake device generates a slight braking force even when the spool is rotated in a fishing line winding direction.

Some well-known dual-bearing reels mechanically brake the spool by a centrifugal force or a magnetic force and are provided with a one-way clutch for preventing the spool brake device from being actuated during a winding of a fishing line (see Japan Laid-open Patent Application Publication No. H10-327722).

In recent years, a type of spool brake device capable of electrically controlling the spool has been developed. This type of spool brake device can be configured to not be actuated during a winding of the fishing line when provided with a one-way clutch, as with the aforementioned type of spool brake device capable of mechanically controlling the spool, or when detecting the rotational direction of the spool. However, when the spool brake device is provided with the one-way clutch, manufacturing cost of the spool brake device increases, and simultaneously, the construction of a dual-bearing reel provided with the spool brake device becomes complicated.

On the other hand, in order to detect the rotational direction of the spool, the spool brake device can be provided with two sensors for detecting rotation or uses a high-precision hall element capable of detecting a variation in direction of magnetic flux. Therefore, a manufacturing cost of the spool brake device increases, and simultaneously, the construction of the dual-bearing reel provided with the spool brake device becomes complicated.

BRIEF SUMMARY

It is an object of the present disclosure to prevent a spool brake of a fishing reel from being actuated during a winding of a fishing line, the spool brake having a simple construction and a low cost, the fishing reel brakes the spool in an electrically controllable manner.

A spool brake device for a fishing reel according to the present disclosure can brake a spool of the fishing reel. The spool brake device includes a spool brake, a rotation detector, a rotational velocity calculator, a casting state determiner and a controller. The spool brake brakes the spool in an electrically controllable manner. The rotation detector detects a rotation of the spool. The rotational velocity calculator calculates a rotational velocity of the spool based on a detected result output from the rotation detector. The casting state determiner determines whether the fishing reel is in a casting state based on a calculated result that is calculated by the rotational velocity calculator. The controller controls the spool brake to brake the spool when the casting state determiner determines that the fishing reel is in the casting state, and controls the spool brake to not brake the spool when the casting state determiner determines that the fishing reel is not in the casting state.

The spool brake device does not necessarily detect the rotational direction of the spool. Rather, the spool brake device can determine whether the fishing reel is in the casting state, not based on the rotational direction of the spool, but based on a rotational velocity of the spool. Additionally, the controller controls the spool brake to brake the spool when the fishing reel is in the casting state. The controller controls the spool brake to not brake the spool when the fishing reel is not in the casting state, such as when the fishing reel is in a fishing line winding state. Here, the casting state is detected based on the rotational velocity of the spool. Hence, the casting state can be detected using only a single rotation detector. Accordingly, braking of the spool can be prevented during a winding of the fishing line with a simple construction at low cost.

The rotation detector can include a sensor that that can output a signal when detecting at least one detection target provided on the spool. According to the aforementioned construction, the casting state can be detected based on the rotational velocity, and the rotational velocity can be calculated based on the detected result of the rotation detector having the sensor. Hence, braking of the spool can be prevented during a winding of the fishing line with a simpler construction at a lower cost.

The spool brake device for a fishing reel can further include a rotational acceleration calculator. The rotational acceleration calculator can calculate a rotational acceleration of the spool based on the detected result by the rotation detector. The casting state determiner can determine that the fishing reel is in the casting state when the rotational acceleration calculated by the rotational acceleration calculator becomes greater than a first rotational acceleration. According to the aforementioned construction, whether the fishing reel is in the casting state can be determined based on the rotational acceleration of the spool obtained based on the detected result of the rotation detector. Hence, whether the fishing reel is in the casting state can be accurately determined.

The controller can set a predicted start time and perform a braking control for the spool brake at a braking start time predicted based on the predicted start time. The predicted start time is set based on a point of time at which the rotational acceleration calculated by the rotational acceleration calculator becomes less than or equal to a predetermined second rotational acceleration greater than the first rotational acceleration after the rotational acceleration calculated by the rotational acceleration calculator is maximized. According to the aforementioned configuration, a braking of the spool is started using the rotational acceleration of the spool which is less likely to fluctuate at around the maximum value than the rotational velocity of the spool. Hence, the spool can be braked at an appropriate timing. Additionally, the predicted start time is set before a braking of the spool is started, and the braking start time of the spool is predicted based on the predicted start time. Hence, a braking of the spool can be reliably started at a good timing.

The spool brake device for a fishing reel can further include a braking duration setter that can set a braking duration from the braking start time until the braking control is finished. The casting state determiner can determine that the fishing reel is not in the casting state when the braking duration has elapsed from the braking start time and simultaneously the rotation of the spool has been detected based on the detected result output from the rotation detector. According to the aforementioned configuration, when the rotation of the spool is detected after the state of the fishing reel is changed from the casting state, the casting state determiner determines that the fishing reel is not in the casting state. Hence, the spool can be prevented from being braked when a fishing line winding operation is started immediately after an ending of a casting.

The spool brake device for a fishing reel can further include a rotational velocity calculator that can calculate the rotational velocity of the spool based on the detected result by the rotation detector. The casting state determiner determines that the fishing reel is in the casting state when the rotational velocity calculated by the rotational velocity calculator becomes greater than a first rotational velocity. According to the aforementioned construction and configuration, the rotational velocity can be easily detected. Hence, whether the fishing reel is in the casting state can be quickly determined.

The spool brake can include a brake magnet and a plurality of coils. The brake magnet unitarily rotates with the spool, and has a plurality of magnetic poles aligned in a circumferential direction. The plurality of coils are disposed at intervals away from an outer peripheral side of the brake magnet. The detection target can be the brake magnet. The sensor can be a magnetic sensor configured to be turned on and off by rotation of the brake magnet. According to the aforementioned construction, the casting state can be detected in a contactless manner by a low-cost magnetic sensor (e.g., a reed switch, a hall element, etc.) configured to only detect passage of the magnetic poles of the brake magnet.

The detection target can be a light reflective member provided on the spool. The sensor can be a photosensor configured to irradiate a light to the spool and be turned on by the light reflected by the light reflective member. According to the aforementioned construction, the casting state is detectable in a contactless manner by the low-cost photosensor (e.g., photoelectric element) configured to be only turned on and off by a light.

Overall, according to the present disclosure, the spool can be prevented from being braked during a winding of the fishing line with a simple construction at a low cost.

BRIEF DESCRIPTION OF THE DRAWINGS

Referring now to the attached drawings which form a part of this original disclosure.

DETAILED DESCRIPTION OF EMBODIMENTS

Figure 1:
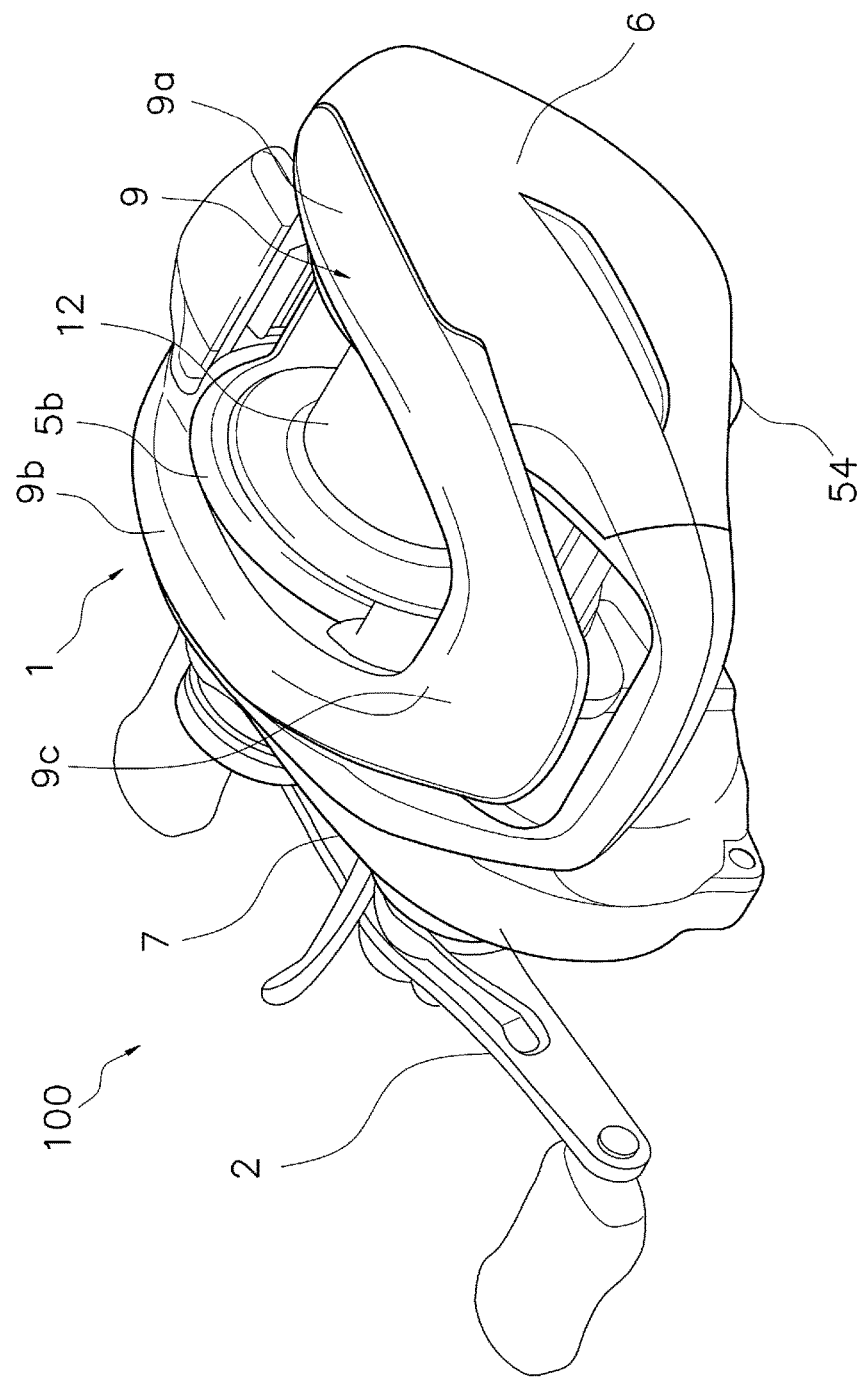
FIG. 1 is a perspective view of a dual-bearing reel employing a first preferred embodiment of the present disclosure.
Figure 2:
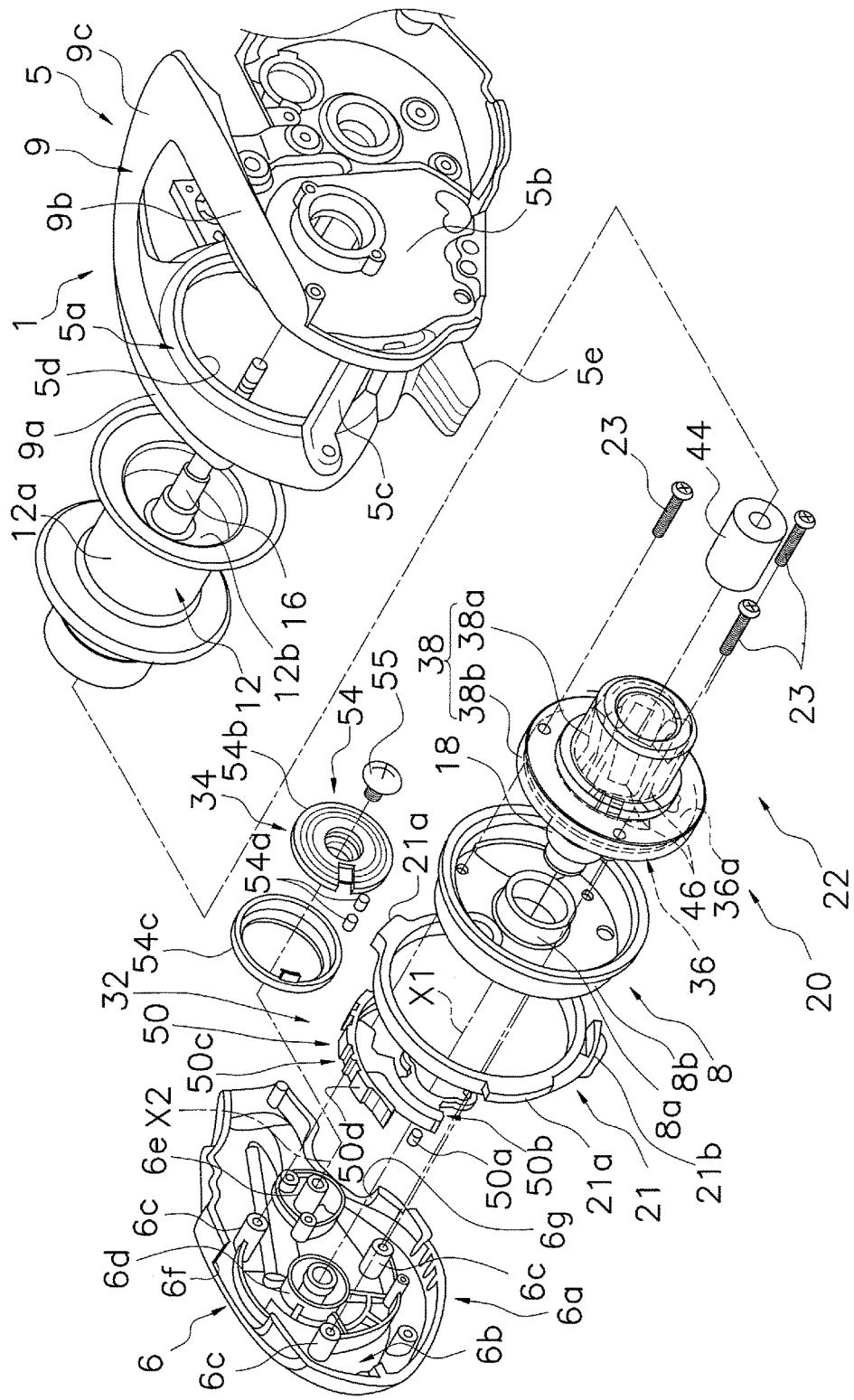
FIG. 2 is an exploded perspective view of the dual-bearing reel including a spool brake mechanism.

As shown in FIGS. 1 and 2, a dual-bearing reel 100 employing a preferred embodiment of the present disclosure includes a reel unit 1, a handle 2, a spool 12 and a spool brake mechanism 20 (see FIG. 2) that can electrically brake the spool 12. The spool brake mechanism 20 is an exemplary spool brake device for the dual-bearing reel 100.

The reel unit 1 includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is opposed to the first side plate 5a. The coupling portions 5c couple the first side plate 5a and the second side plate 5b. The first side plate 5a includes a circular opening 5d enabling the spool 12 to pass therethrough. Among the plural coupling portions 5c, the one coupling the first side plate 5a and the second side plate 5b on the bottom side is provided with a fishing rod attachment leg 5e to be attached to a fishing rod. The spool brake mechanism 20 is detachably mounted to a position about the opening 5d on the first side plate 5a of the frame 5. The first side cover 6 is detachably mounted to the first side plate 5a of the frame 5. The first side cover 6 includes a cover body 6a and a shaft support portion 8 mounted to an inner surface 6b of the cover body 6a.

A plurality of (e.g., three) fixation bosses 6c are provided on the inner surface 6b of the cover body 6a so as to fix the shaft support portion 8. Additionally, a first mount boss 6d and a second mount boss 6e are separately provided on the inner surface 6b so as to enable a first selector 32 (to be described) and a second selector 34 (to be described) of the spool brake mechanism 20 to be rotatably mounted thereto.

The first mount boss 6d has a tubular shape formed about a first axis X1. The second mount boss 6e has a shape formed about a second axis X2 arranged in parallel to the first axis X1. The second axis X2 is arranged forward of the first axis X1 and adjacently to the fishing rod attachment leg 5e. The first axis X1 is arranged coaxially to a spool shaft 16 (to be described) in a condition that the cover body 6a is mounted to the first side plate 5a.

Figure 4:
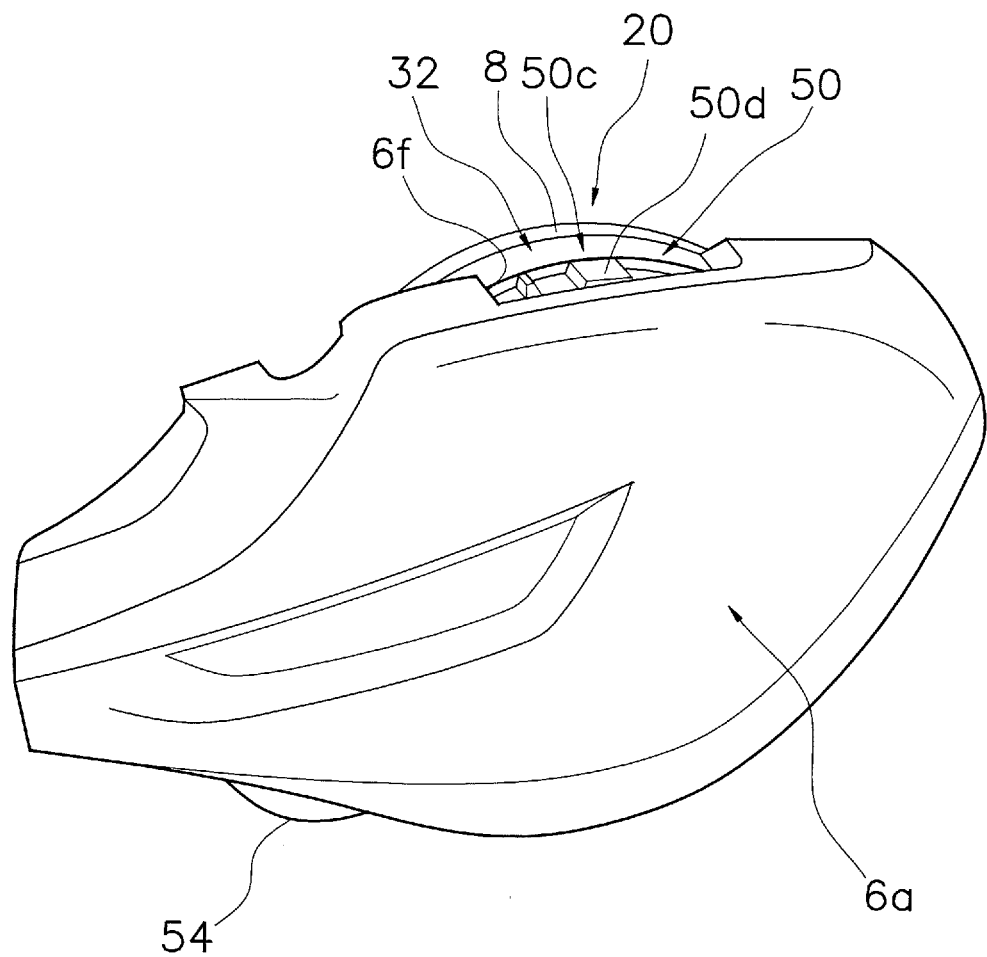
FIG. 4 is a perspective view of the spool brake mechanism.

The cover body 6a abuts the thumb rest 9, and is covered by a first bulge 9a (to be described) of the thumb rest 9. The part of the cover body 6a, covered with the first bulge 9a, includes a first opened part 6f. The first opened part 6f has a rectangular shape and enables the first selector 32 to be exposed therethrough. Therefore, as shown in FIG. 4, the first selector 32 is inoperable unless the first side cover 6 is detached from the frame 5. The cover body 6a has a second opened part 6g below the second mount boss 6e. The second opened part 6g has a rectangular shape and enables the second selector 34 to outwardly protrude therethrough. Therefore, the second selector 34 is operable even when fishing is carried out.

One end of the spool shaft 16 of the spool 12 is rotatably supported by the shaft support portion 8. The shaft support portion 8 is a flat cylindrical member having a partially closed end. The shaft support portion 8 includes a tubular bearing accommodation part 8a in its center. The bearing accommodation part 8a protrudes from the inner surface of the shaft support portion 8 and accommodates a bearing 18 whereby the aforementioned one end of the spool shaft 16 is rotatably supported. An attachment/detachment ring 21 is rotatably mounted to an outer peripheral surface 8b of the shaft support portion 8. The attachment/detachment ring 21 attaches/detaches the shaft support portion 8 to/from a position about the opening 5d on the first side plate 5a. The attachment/detachment ring 21 detachably attaches the shaft support portion 8 to the first side plate 5a with a heretofore known bayonet structure. The attachment/detachment ring 21 has a plurality of (e.g., three) pawls 21a and an operation knob 21b. The pawls 21a protrude radially outward from the outer peripheral surface of the attachment/detachment ring 21. The operation knob 21b performs an attachment/detachment operation. The plural pawls 21a respectively have a slope with a gradually decreasing thickness, and are engaged with a plurality of engaging grooves (not shown in the drawings) provided about the opening 5d.

When the attachment/detachment ring 21 is rotated in one direction (e.g., counterclockwise direction in FIG. 2) by downwardly operating the operation knob 21b with a fingertip, the pawls 21a are disengaged from the engaging grooves, and the shaft support portion 8 and the first side cover 6 are unlocked from the first side plate 5a. Contrarily, when the attachment/detachment ring 21 is rotated in the other direction by, for instance, upwardly operating the operation knob 21b with the fingertip, the pawls 21a are engaged with the engaging grooves, and the shaft support portion 8 and the first side cover 6 are locked to the first side plate 5a. The shaft support portion 8 is fixed to the first side cover 6 together with part of the constituent elements of the spool brake mechanism 20 by a plurality of (e.g., three) bolt members 23. In the condition that the shaft support portion 8 is fixed to the first side cover 6, the attachment/detachment ring 21 is restricted from moving in a spool shaft direction and is rotatable with respect to the shaft support portion 8.

As shown in FIGS. 1 and 2, the thumb rest 9 includes the first bulge 9a, a second bulge 9b and a third bulge 9c. The first bulge 9a outwardly bulges from the upper part of the first side plate 5a. The second bulge 9b outwardly bulges from the upper part of the second side plate 5b. The third bulge 9c forwardly bulges, and couples the first side plate 5a and the second side plate 5b at the front part of the frame 5.

The handle 2 is rotatably supported by the reel unit 1. The spool 12 is rotatably held by the reel unit 1 and disposed between the first side plate 5a and the second side plate 5b. Rotation of the handle 2 is transmitted to the spool 12 through a rotation transmission mechanism (not shown in the drawings). A clutch mechanism is mounted to an intermediate part of the rotation transmission mechanism. The clutch mechanism is capable of switching the spool 12 between an off state and an on state. In the off state, the spool 12 becomes freely rotatable. In the on state, the rotation of the handle 2 is transmitted to the spool 12.

Figure 3:
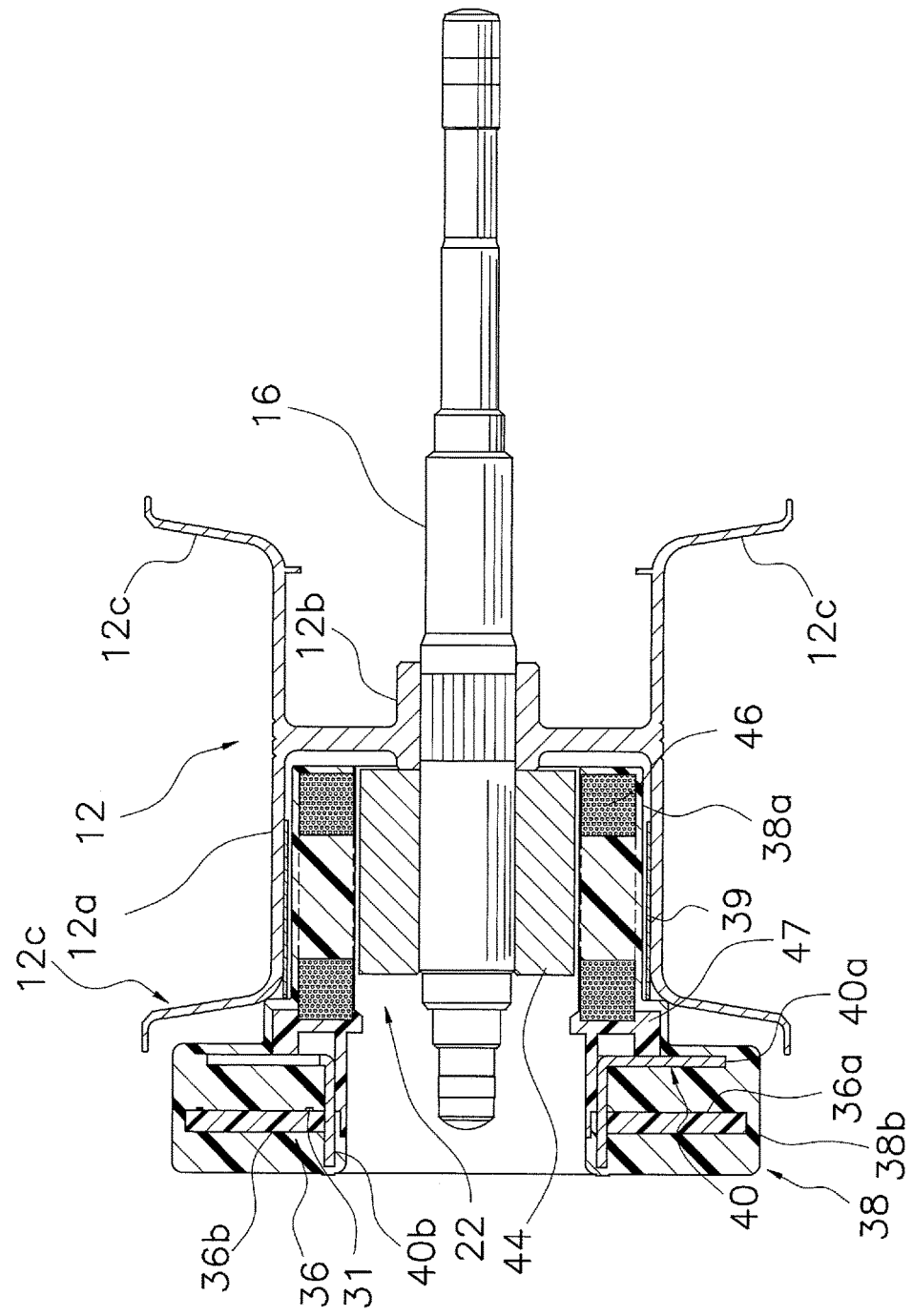
FIG. 3 is a cross-sectional view of a spool brake in a condition that a circuit board and a coil are covered with a cover member.

As shown in FIG. 3, the spool 12 includes a bobbin trunk 12a, a tubular part 12b and a pair of flanges 12c. The bobbin trunk 12a is capable of winding the fishing line thereabout. The tubular part 12b is integrated with the bobbin trunk 12a and is fixed onto the spool shaft 16. The flanges 12c are provided on each of the axial ends of the bobbin trunk 12a, and the flanges 12c have a larger diameter than the bobbin trunk 12a. The spool shaft 16 is coupled to the inner peripheral surface of the tubular part 12b in a unitarily rotatable state. The aforementioned one end of the spool shaft 16 is rotatably supported by the shaft support portion 8 through the bearing 18. The other end of the spool shaft 16 is rotatably supported by the second side cover 7 through a bearing (not shown in the drawings).

Spool Brake Mechanism

As shown in FIGS. 2, 3, 4 and 7, the spool brake mechanism 20 includes a spool brake unit 22 and a spool control unit 24 that can control the spool brake unit 22. The spool brake unit 22 is an exemplary spool brake.

The spool brake unit 22 brakes the spool 12 in an electrically controllable manner. The spool brake unit 22 includes a brake magnet 44 mounted to the spool 12 in a unitarily rotatable state, a plurality of coils 46 connected in series, and a switch element 48 (see FIG. 7). The brake magnet 44 is mounted to the spool shaft 16 in a unitarily rotatable state. In the present preferred embodiment, the brake magnet 44 is fixed to the spool shaft 16 by an adhesive. The brake magnet 44 is a cylindrical magnet magnetized to have magnetic anisotropy, and has a plurality of magnetic poles. The plural coils 46 are disposed on the outer peripheral side of the brake magnet 44 and are aligned at predetermined intervals in a tubular arrangement. The coils 46 are attached to a circuit board 36 (to be described) through a coil attaching member 47. Coreless coils are herein used as the coils 46 preventing a cogging in order to smoothly rotate the spool 12. Moreover, the coils 46 do not necessarily have a yoke. Wires of the coils 46 are respectively wound in a roughly rectangular shape. The wound wires are opposed to the brake magnet 44 and are disposed within the magnetic field of the brake magnet 44. Both ends of the plural coils 46 connected in series are electrically connected to the switch element 48 mounted to the circuit board 36. In the present preferred embodiment, four coils 46 are provided. Each of the coils 46 has a circular-arc curved shape. The plural coils 46 are circumferentially disposed at intervals, and the entirety of each of the plural coils 46 has a roughly tubular shape. The switch element 48 is implemented by, for instance, a field effect transistor.

The spool brake unit 22 brakes the spool 12 by causing the switch element 48 to switch an electric current on and off, and the electric current is generated by relative rotation between the brake magnet 44 and the coils 46 so as to change a duty cycle. The braking force generated by the spool brake unit 22 is strengthened by an increase in length of a switch-on time by the switch element 48 (i.e., with increase in magnitude of duty cycle). The switch element 48 is connected to an electric storage element 51 through a rectifier circuit 49. The electric storage element 51 stores electric power generated by the coils 46 during a casting. The electric storage element 51 functions as a power source that supplies electric power to the spool control unit 24 and to electric components connected to the spool control unit 24. The electric storage element 51 is implemented by, for instance, an electrolytic capacitor or a battery.

Figure 7:
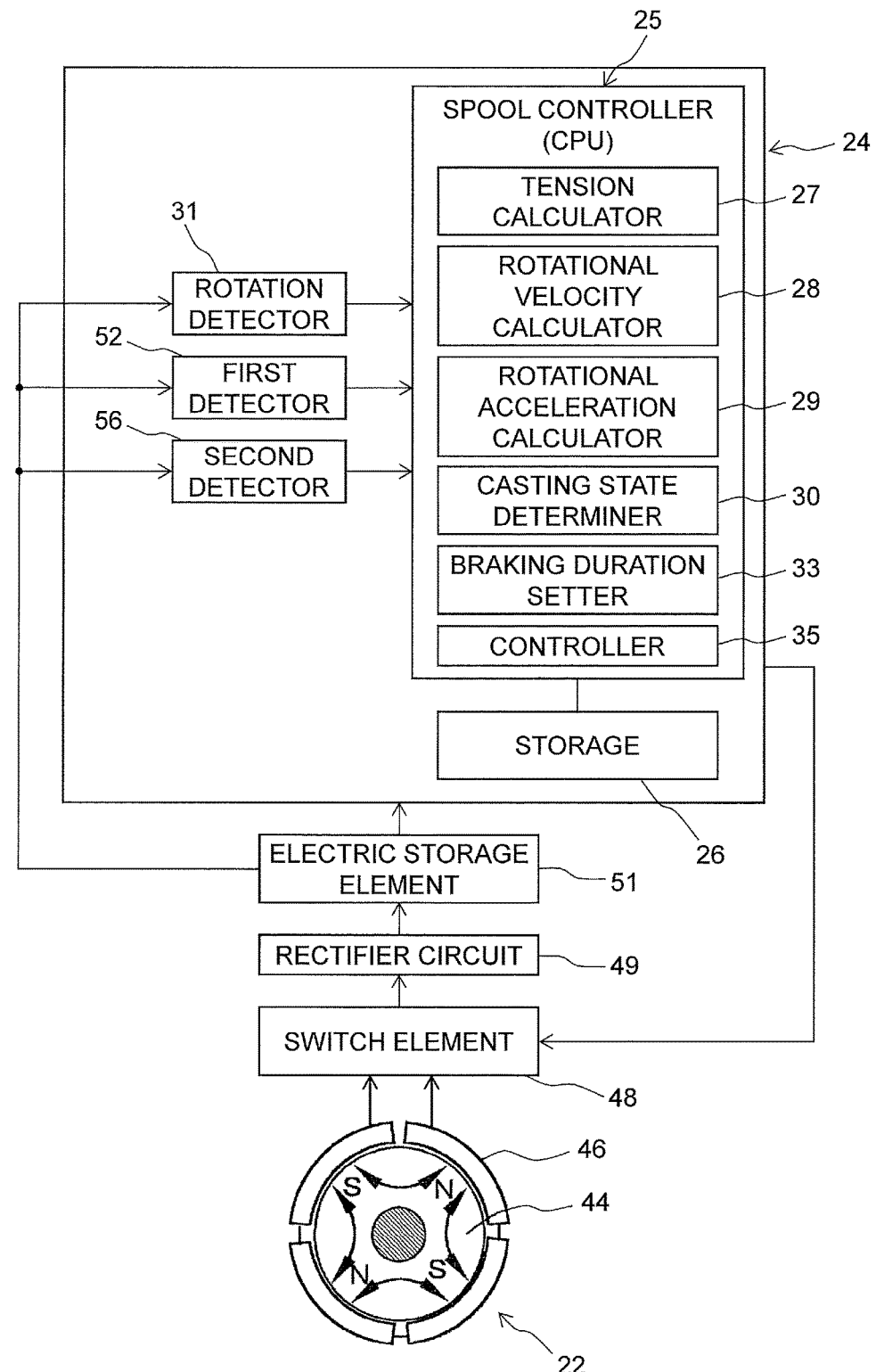
FIG. 7 is a block diagram of a brake unit.

As shown in FIG. 7, the spool control unit 24 includes a spool controller 25 and a storage 26. The spool controller 25 is implemented by a microcomputer including a ROM (such as a PROM, a EPROM, a EEPROM, a Flash EEPROM, an optical memory, a magnetic memory, or a flash memory), a RAM (such as a SDRAM, a DDR SDRAM, a DRAM, or a Rambus DRAM) and a CPU (such as a RISC microprocessor, a CISC microprocessor, an ASIC microprocessor, a Superscalar Processor, or a Digital Signal microprocessor). The CPU of the spool controller 25 is an example of a spool brake controlling means. The storage 26 is implemented by a non-volatile memory such as an EEPROM, ferroelectric RAM, optical memory, or a flash memory. A rotation detector 31, a first detector 52 and a second detector 56 are electrically connected to the spool controller 25.

In one embodiment, the spool controller 25 includes a tension calculator 27, a rotational velocity calculator 28, a rotational acceleration calculator 29, a casting state determiner 30, a braking duration setter 33 and a controller 35 as functional constituent elements implemented by software. The rotational velocity calculator 28 calculates a rotational velocity ω of the spool 12 based on an output signal from the rotation detector 31. The tension calculator 27 calculates a tension F acting on the fishing line based on the information output from the rotational velocity calculator 28. The rotational acceleration calculator 29 calculates a rotational acceleration ωa of the spool 12 based on a variation in time of the calculated rotational velocity ω. The casting state determiner 30 determines whether the dual-bearing reel 100 is in a casting state based on the calculated rotational velocity ω, the calculated rotational acceleration ωa and a braking end time. The braking duration setter 33 sets a braking duration from a braking start time to the braking end time in based on a maximum rotational velocity ωmax. The controller 35 controls the spool brake unit 22 based on the rotational velocity, the casting state, and the braking duration.

The tension F can be calculated by a rate of change (Δω/Δt) of the rotational velocity ω of the spool 12 and an inertia moment J of the spool 12. When the rotational velocity of the spool 12 varies during a casting, the rotational velocity at this time is different from the rotational velocity of the spool 12 independently and freely rotating without receiving a tension from the fishing line. The difference is attributed to a rotational driving force (i.e., torque) generated by the tension from the fishing line. A driving torque T can be expressed with the following equation (1), where the rate of change of the rotational velocity at this time is set to be (Δω/Δt).

$$T = J \times (\Delta\omega/\Delta t) \quad (1)$$

When the driving torque T is calculated by the equation (1), the tension F can be calculated with the radius of a point of action of the fishing line (normally 15 to 20 mm). Therefore, in the present preferred embodiment, the tension F can be detected by calculation with the rate of change of the rotational velocity ω.

The spool controller 25 changes the braking force by performing a duty cycle control for the switch element 48. The spool controller 25 changes the braking force based on the tension F detected by the tension calculator 27 and a reference tension Fr. The magnitude of the reference tension Fr is set according to a plurality of brake modes.

The storage 26 stores a plurality of data sets, each containing 15 types of data created by the combinations of the five brake modes (to be described) and the three types of fishing line (to be described). In some embodiments, the number of data sets is equal to the number of brake modes multiplied by the number of fishing line types.

Figure 5:
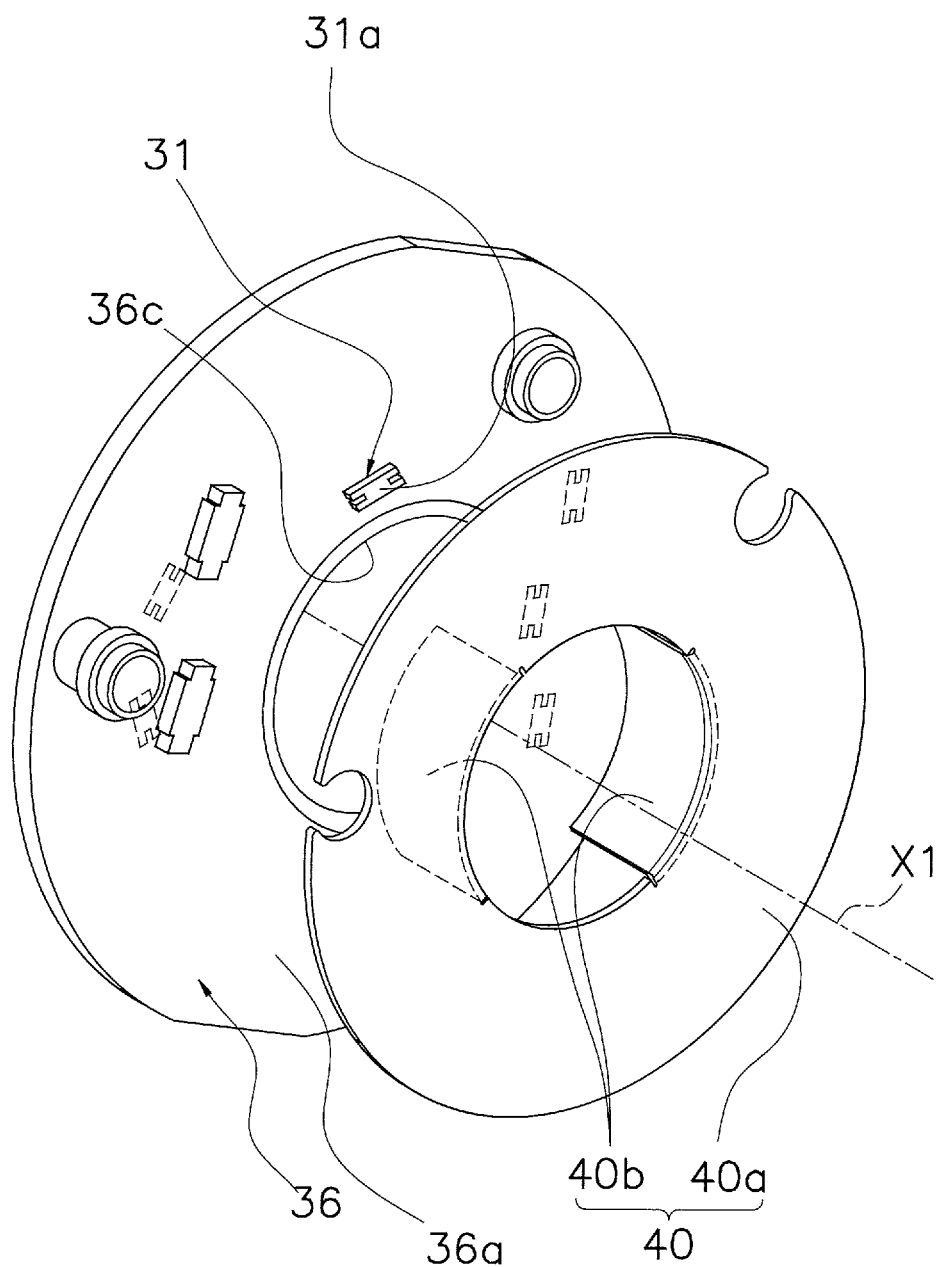
FIG. 5 is an exploded perspective view of the circuit board and a magnetic flux shield member.
Figure 6:
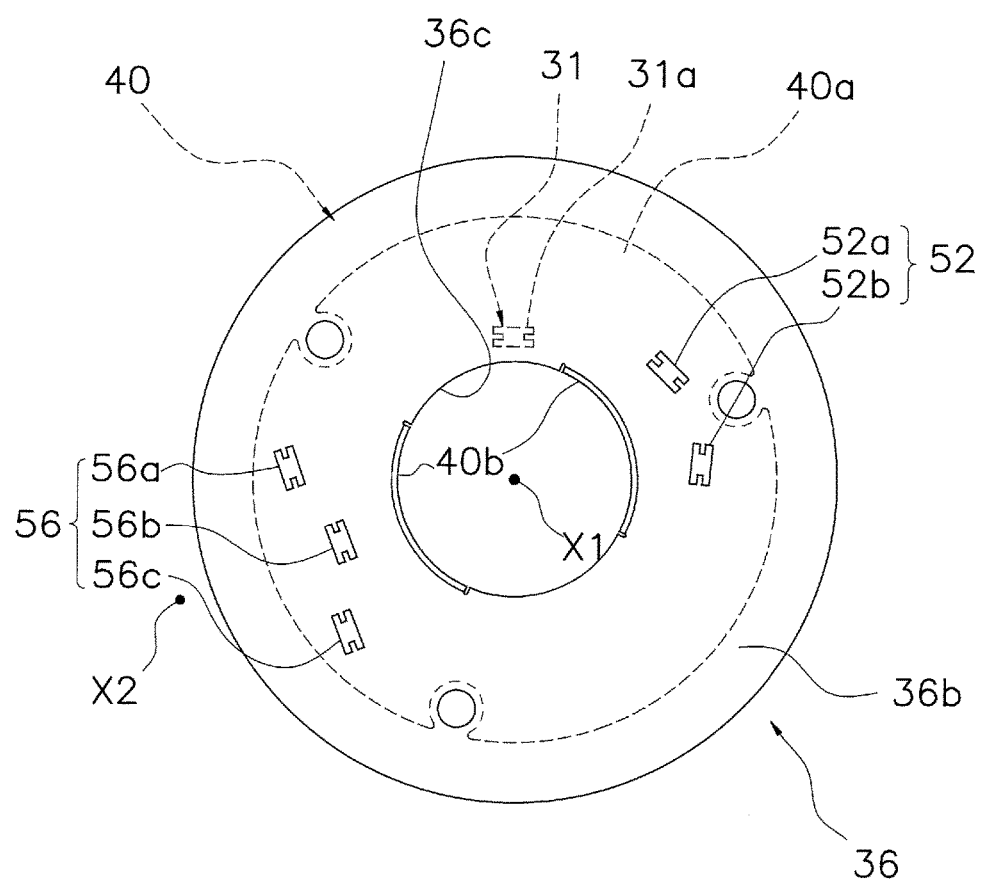
FIG. 6 is a bottom view of the circuit board seen from its second surface side.

Moreover, the spool brake mechanism 20 further includes the rotation detector 31 shown in FIGS. 3, 5, 6 and 7, the first selector 32 shown in FIGS. 2 and 4, the second selector 34, the circuit board 36, a cover member 38, a first magnetic flux shield member 39 and a second magnetic flux shield member 40. As shown in FIGS. 3, 5 and 6, the rotation detector 31 can include a hall element 31a. The rotation detector 31 is an exemplary rotation detecting means. The hall element 31a is mounted to the inner peripheral region of a first surface 36a of the circuit board 36, and located in a position opposed to a gap, the gap between two adjacent coils 46. The hall element 31a is an exemplary sensor and is also an exemplary magnetic sensor. The hall element 31a can be a low-cost sensor configured to be only turned on and off in accordance with predetermined rotational phases of the brake magnet 44. The rotation detector 31 calculates the rotational velocity ω of the spool 12. Additionally, as described above, the rotational acceleration ωa and the tension F acting on the fishing line can be also calculated based on a variation in the rotational velocity ω of the spool 12 over time.

The first selector 32 can select any one of a plurality of brake modes of the spool brake unit 22 according to types of fishing line. In the present preferred embodiment, for instance, one of three brake modes is selectable with each mode according to one of three types of fishing line (e.g., nylon line, fluorocarbon line (polyvinylidene fluoride line), and PE line (polyethylene fiber thread)).

The first selector 32 includes a first selection operating portion 50 and the first detector 52 (see FIGS. 6 and 7). The first selection operating portion 50 includes at least one (e.g., two) first magnet 50a. In one embodiment, the first detector 52 is opposed to the two first magnets 50a and detects the selection position of the first selection operating portion 50. Thus, the first detector 52 is an example of a selection detecting means.

In one embodiment the first selection operating portion 50 is mounted to the reel unit 1 such that the first selection operating portion 50 is movable within a first range divided into positions corresponding to a plurality of levels. In the present preferred embodiment, the first selection operating portion 50 is rotatably mounted to the inner surface 6b of the cover body 6a such that the first selection operating portion 50 is settable in, for instance, any one of the positions corresponding to three levels in the first range. The first selection operating portion 50 includes a lever member 50b to which the (e.g., two) first magnets 50a are mounted. A tip of the lever member 50b includes a first exposed part 50c. The first exposed part 50c curves in a circular-arc shape and includes a plurality of convex parts 50d. The convex parts 50d are located on the surface of the first exposed part 50c, and circumferentially aligned at intervals. The lever member 50b is attached to the outer peripheral surface of the first mount boss 6d such that the lever member 50b is rotatable about the first axis X1 within the first range. The first range is an angular range of, for instance, 30 degrees or less. In the present preferred embodiment, the first mount boss 6d is disposed concentrically to the spool shaft 16. Thus, the first selection operating portion 50 is rotated about the spool shaft 16. In the condition that the first selection operating portion 50 is mounted to the first side cover 6, the first exposed part 50c is exposed through the first opened part 6f while protruding therefrom. However, in the condition that the first side cover 6 is mounted to the first side plate 5a, the first opened part 6f is covered with the thumb rest 9 and thus the first exposed part 50c of the first selection operating portion 50 hides in the reel unit 1. With the aforementioned construction, it is possible to avoid a situation in which the regulated condition is changed against a user's intention while fishing.

As shown in FIGS. 6 and 7, the first detector 52 is on an outer peripheral region of a second surface 36b of the circuit board 36, and away from the brake magnet 44. The first detector 52 includes two hall elements 52a and 52b. The hall elements 52a and 52b are disposed on the second surface 36b such that they can be opposed to the two first magnets 50a. The two hall elements 52a and 52b can be low-cost elements, similar to the hall elements 31a, and are disposed about the first axis X1 at a predetermined interval.

The second selector 34 selects any one of a plurality of brake modes. The magnitude of braking force can be set differently for each of the brake modes. In the present preferred embodiment, any one of five brake modes is selectable by the second selector 34. The five brake modes include four brake modes, Mode 1 to Mode 4, and an automatic brake mode. In the four brake modes, Mode 1 to Mode 4, the magnitude of the braking force increases in order from Mode 1 to Mode 4. In the automatic brake mode, the braking force can be regulated in a wide range according to a mass of a terminal tackle, the condition of a fishing site, and so forth. The second selector 34 includes a second selection operating portion 54 and the second detector 56. The second selection operating portion 54 includes at least one (e.g., three) second magnet 54a. The second detector 56 is opposed to three second magnets 54a and detects the regulation position of the second selection operating portion 54. Thus, the second detector 56 is an example of a selection detecting means.

The second selection operating portion 54 is mounted to the reel unit 1 such that the second selection operating portion 54 is movable within a second range divided into positions corresponding to a plurality of levels. In the present preferred embodiment, the second selection operating portion 54 is rotatably mounted to the inner surface 6b of the cover body 6a such that second operating portion 54 is settable in, for instance, any one of the positions corresponding to five levels within the second range. The second range is an angular range of, for instance, 120 degrees or less. The second selection operating portion 54 includes an operating portion body 54b and a second exposed part 54c. The operating portion body 54b is a member to which the (e.g., three) second magnets 54a are mounted. The second exposed part 54c is fixed to the operating portion body 54b by, for instance, an elastic coupling. The operating portion body 54b is attached to the inner surface 6b of the cover body 6a by a screw member 55 to be screwed into the second mount boss 6e such that the operating portion body 54b is rotatable about the second axis X2. In the case that the first side cover 6 is mounted to the first side plate 5a, the second exposed part 54c is exposed through the second opened part 6g. With the aforementioned construction, the position of the second selection operating portion 54 can be regulated with a fingertip of the user's hand holding the dual-bearing reel 100 on the palm in carrying out fishing.

As shown in FIG. 6, the second detector 56 is on the outer peripheral region of the second surface 36b of the circuit board 36, and away from the brake magnet 44. The second detector 56 is on the second surface 36b of the circuit board 36, away from the first detector 52, substantially at an angular interval of 180 degrees from the first detector 52. The second detector 56 includes three hall elements 56a, 56b and 56c. The three hall elements 56a, 56b and 56c are disposed on the second surface 36b of the circuit board 36 such that they can be opposed to the three second magnets 54a. The three hall elements 56a, 56b and 56c can be low-cost elements, similar to the hall element 31a, and are disposed about the second axis X2 at intervals.

The circuit board 36 has a disc shape having a through hole 36c. The circuit board 36 is mounted to one of the surfaces of the shaft support portion 8, i.e., the surface opposed to the spool 12, and is disposed on the outer peripheral side of the bearing accommodation part 8a. The circuit board 36 includes the first surface 36a and the second surface 36b. The first surface 36a is the surface to which the coils 46 are mounted. The second surface 36b is on the opposite side of the circuit board 36 from the first surface 36a. The circuit board 36 is fixed to the first side cover 6 together with the shaft support portion 8, the cover member 38 and the magnetic flux shield member 40, and is fixed to the first side cover 6 by the bolt members 23.

As shown in FIGS. 2 and 3, the cover member 38 is a stepped tubular member made of synthetic resin and insulates the circuit board 36, the coils 46 and electric components mounted to the circuit board 36. The cover member 38 includes a first cover part 38a and a second cover part 38b. The first cover part 38a covers the tips, the inner peripheral parts and the outer peripheral parts of the plural coils 46. The second cover part 38b is integrated with the first cover part 38a, and covers the outer peripheral part, the inner peripheral part, the first surface 36a and the second surface 36b of the circuit board 36. The first cover part 38a is on the outer peripheral side of the brake magnet 44. Put differently, the cover member 38 seals the circuit board 36 by covering the entire surface of the circuit board 36 to which the coils 46 and the electric components including the detectors are mounted.

As shown in FIG. 3, the first magnetic flux shield member 39 is mounted to the inner peripheral surface of the bobbin trunk 12a of the spool 12, and is thereby rotatable unitarily with the spool 12. The first magnetic flux shield member 39 is a tubular member made of iron. The first magnetic flux shield member 39 increases the magnetic flux density of the brake magnet 44 in the surroundings of the coils 46. The first magnetic flux shield member 39 makes it unlikely that the rotation detector 31 will be affected by the magnetic flux of the brake magnet 44.

As shown in FIGS. 5 and 6, the magnetic flux shield member 40 is a circular member made of, for instance, an iron plate. The second magnetic flux shield member 40 shields the first detector 52 and the second detector 56 from the magnetic flux of the brake magnet 44. With the second magnetic flux shield member 40 being provided, the first detector 52 and the second detector 56 can accurately detect the first magnets 50a and the second magnets 54a without being affected by the magnetic flux of the brake magnet 44. The second magnetic flux shield member 40 is fixed by the bolt members 23 to the first side cover 6 together with the shaft support portion 8 and the circuit board 36 sealed by the cover member 38.

The second magnetic flux shield member 40 includes a first shield part 40a having a ring shape and a pair of second shield parts 40b. The first shield part 40a is fixed to the coil attaching member 47 by, for instance, an adhesive. The second shield parts 40b extend from the first shield part 40a, and each has a circular-arc cross section arranged about the first axis X1. The first shield part 40a is opposed to the first surface 36a of the circuit board 36 at an interval.

The pair of second shield parts 40b are located at an angular interval of 180 degrees about the first axis X1 so as to prevent the magnetic flux of the brake magnet 44 from reaching the first detector 52 and the second detector 56. The second shield parts 40b are disposed in positions opposed to the first detector 52 and the second detector 56. The axial length of each second shield part 40b is set such that each second shield part 40b protrudes from the second surface 36b of the circuit board 36, but does not reach the first side cover 6 and a side end surface of the cover member 38. With the aforementioned construction, the magnetic flux of the brake magnet 44 is prevented from reaching the first detector 52 and the second detector 56. It should be noted that the second magnetic flux shield member 40 is covered by the cover member 38, and is thus not visible from outside.

When using a different type of fishing line from a previously used one, the spool brake mechanism 20 constructed as described above requires detachment of the first side cover 6 from the reel unit 1. Specifically, when the attachment/detachment ring 21 is rotated in one direction (e.g., counterclockwise direction in FIG. 2) by downwardly operating the operating knob 21b disposed in the rear part of the dual-bearing reel 100 with a fingertip, the spool brake mechanism 20, including the circuit board 36, the first side cover 6 and so forth, is detached from the reel unit 1. This condition is shown in FIG. 4. Consequently, the first selection operating portion 50 of the first selector 32 is exposed through the first opened part 6f. This enables an operation of selecting a suitable brake mode according to the type of fishing line. When this operation is finished, the spool brake mechanism 20 closely contacts the first side plate 5a. Then, when the attachment/detachment ring 21 is rotated in the other direction by, for instance, upwardly operating the operation knob 21b with a fingertip, the spool brake mechanism 20 is attached to the frame 5.

Next, a control action performed by the spool controller 25 during a casting will be schematically explained with reference to the chart of FIG. 8. It should be noted that in FIG. 8, elapsed time t from starting of casting is represented in the horizontal axis, whereas the rotational velocity $\omega$ and the rotational acceleration $\omega a$ of the spool 12 are represented in the vertical axis.

When casting is started and the spool 12 is rotated, electric power is supplied to the spool control unit 24 from the electric storage element 51 and a spool control is started. When electric power is supplied to the spool control unit 24, data are read out of the storage 26 in accordance with a brake mode selected based on the operating position of the first selector 32 and that of the second selector 34, and are set in the spool controller 25. At this time, as depicted with a solid line in FIG. 8, the rotational acceleration $\omega a$ of the spool 12 becomes maximized ($\omega a max$) in an early stage of casting. On the other hand, the rotational velocity $\omega$ of the spool 12 thereafter becomes maximized ($\omega max$).

Additionally, the spool controller 25 calculates the rotational velocity $\omega$ and the rotational acceleration $\omega a$ based on an output of the rotation detector 31 and detects the tension F based on the calculated rotational acceleration $\omega a$ (=$\Delta\omega$/$\Delta t$). Then, the spool controller 25 controls the spool brake unit 22 based on the tension F and the reference tension Fr.

In this control, the spool controller 25 determines whether the dual-bearing reel 100 is in the casting state. When determining that the dual-bearing reel 100 is in the casting state, the spool controller 25 controls and causes the spool brake unit 22 to brake the spool 12. However, when determining that the dual-bearing reel 100 is not in the casting state, for instance, during a winding of the fishing line, the spool controller 25 does not brake the spool 12. Accordingly, the spool 12 is not braked during a winding of the fishing line. The spool controller 25 determines whether the dual-bearing reel 100 is in the casting state based on, for instance, the rotational acceleration $\omega a$ of the spool 12. For example, when the rotational acceleration $\omega a$ exceeds a first rotational acceleration $\omega a1$ (e.g., 4 to 10 rad/sec$^2$), the spool controller 25 determines that the dual-bearing reel 100 is in the casting state. On the other hand, when rotation of the spool 12 is detected at the end time of braking control, the spool controller 25 determines that the dual-bearing reel 100 is not in the casting state.

Figure 9:
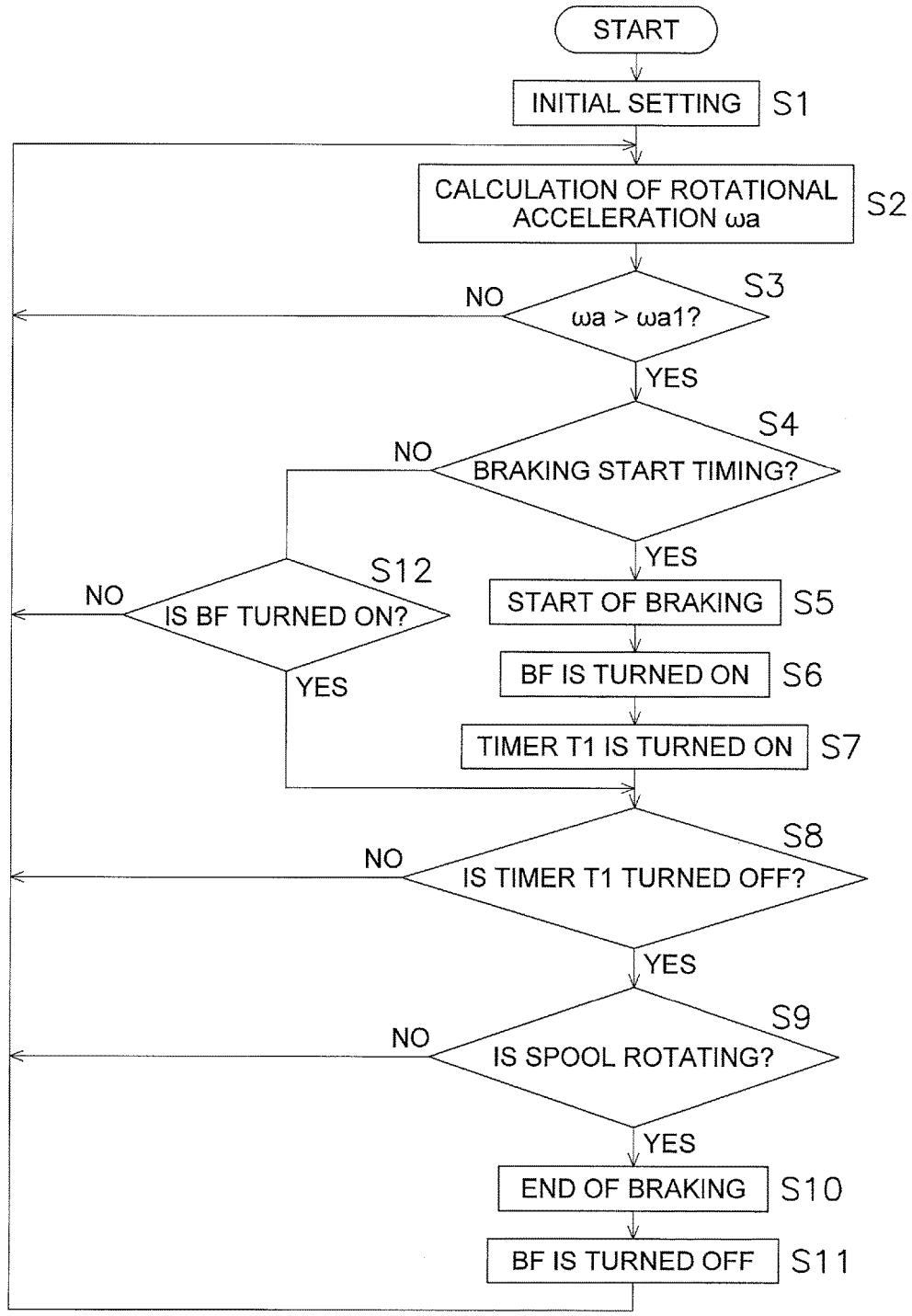
FIG. 9 is a flowchart showing an algorithm of an exemplary brake action of a spool controller.

Next, a spool control action will be explained based on the flowchart of FIG. 9. It should be noted that the control flowchart shown in FIG. 9 illustrates an exemplary algorithm of a control action, and the control action of the present disclosure is not limited to this.

When the spool 12 is rotated by casting, electric power is stored in the electric storage element 51 and the spool controller 25 is powered on. Now in step S1 of FIG. 9, the spool controller 25 performs an initial setting. In the initial setting, the spool controller 25 resets a variety of items (flag, timer, data, etc.). Then, the processing proceeds to step S2. In step S2, the spool controller 25 calculates the rotational acceleration $\omega a$ based on the time interval of a pulse output from the rotation detector 31. Then, the processing proceeds to step S3. In step S3, the spool controller 25 determines whether the dual-bearing reel 100 is in the casting state. Specifically, the spool controller 25 determines whether the calculated rotational acceleration $\omega a$ has become greater than a first rotational acceleration $\omega a1$. When the calculated rotational acceleration $\omega a$ is less than or equal to the first rotational acceleration $\omega a1$, the spool controller 25 determines that the dual-bearing reel 100 is not in the casting state. Then, the processing proceeds to step S2. Thus, when the dual-bearing reel 100 is not in the casting state, the spool controller 25 does not perform the braking control for the spool brake unit 22.

Figure 8:
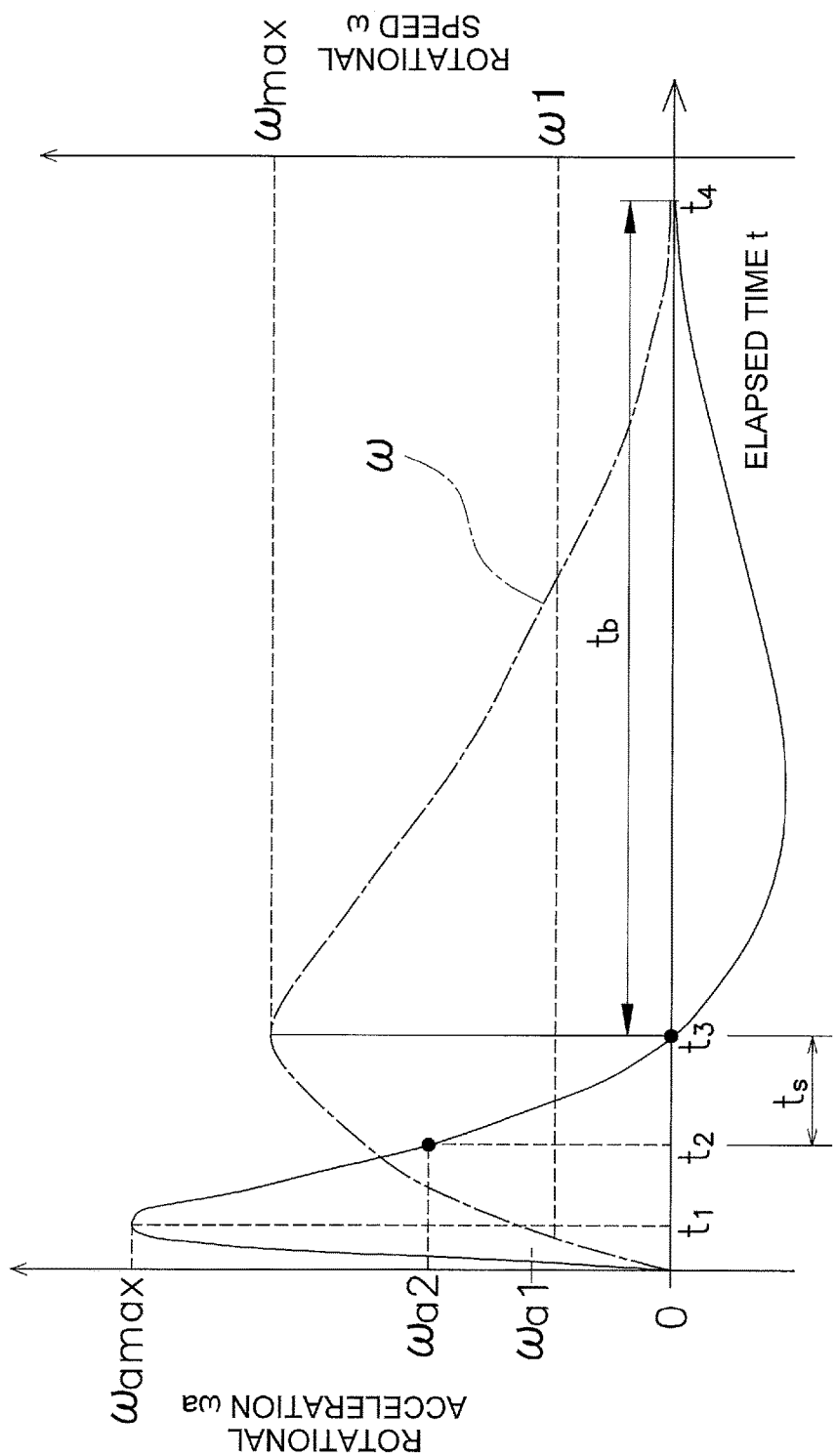
FIG. 8 is a chart explaining a variation in a rotational velocity and a rotational acceleration of a spool during a casting.

When the rotational acceleration $\omega a$ has become greater than the first rotational acceleration $\omega a1$ shown in FIG. 8, the spool controller 25 determines that the dual-bearing reel 100 is in the casting state. Then, the processing proceeds from step S3 to step S4. In step S4, the spool controller 25 determines whether a braking start timing has come. The braking start timing is a time at which the rotational velocity $\omega$ of the spool 12 reaches the maximum rotational velocity $\omega max$ and a braking of the spool 12 is started. Specifically, as shown in FIG. 8, the spool controller 25 calculates the rotational velocity $\omega$ based on a pulse output from the rotation detector 31 in a time-series manner. Based on this data, the spool controller 25 sets a point of time, at which the calculated rotational velocity $\omega$ is maximized ($\omega max$), as the braking start timing.

When the rotational velocity $\omega$ herein fluctuates at around the maximum rotational velocity $\omega max$, the braking start timing can be set based on the rotational acceleration $\omega a$. Specifically, the spool controller 25 herein sets a predicted start time t2 based on a point of time at which the rotational acceleration $\omega a$ becomes less than or equal to a predetermined second rotational acceleration $\omega a2$ greater than the first rotational acceleration $\omega a1$ after the calculated rotational acceleration $\omega a$ is maximized ($\omega a max$) at time t1. Then, the spool controller 25 sets a braking start time t3, predicted based on the predicted start time t2.

When the spool controller 25 determines that the elapsed time has reached the braking start time t3 and the braking start timing has come, the processing proceeds from step S4 to step S5. In step S5, the spool controller 25 starts the braking control. Then, the processing proceeds to step S6. In step S6, the spool controller 25 turns on a braking flag BF indicating that the braking control has been started. Then, the processing proceeds to step S7. In step S7, the spool controller 25 turns on and causes a timer T1 to start counting braking duration tb. The braking duration tb is a period of time from the start to the end of the braking control, and has been set in the timer T1. Then, the processing proceeds to step S8. In step S8, the spool controller 25 determines whether the timer T1 has finished counting the braking duration tb (i.e., the braking duration tb has passed from the braking start time t3 and thus the elapsed time has reached braking end time t4) and has been turned off. When the timer T1 has been turned off, the processing proceeds from step S8 to step S9. When the timer T1 has not been turned off yet, the processing proceeds from step S8 to step S2. Then, the spool controller 25 continues the braking control.

In step S9, the spool controller 25 determines whether the spool 12 is being rotated based on the pulse output from the rotation detector 31. When the spool 12 is not being rotated, the processing proceeds from step S9 to step S2. Then, the spool controller 25 continues the braking control. When the spool 12 is being rotated, the processing proceeds from step S9 to step S10. In step S10, the spool controller 25 finishes the braking control. Then, the processing proceeds to step S11. In step S11, the spool controller 25 turns off the braking flag BF. Then, the processing proceeds to step S2. It should be noted that when rotation of the spool 12 stops, electric power supply is stopped from the electric storage element 51 to the spool control unit 24. Hence, the spool controller 25 is reset and does not perform the aforementioned control.

Now back to step S4, when the spool controller 25 determines that the elapsed time has not reached the braking start timing yet, the processing proceeds to step S12. In step S12, the spool controller 25 determines whether the braking flag BF has been turned on, i.e., whether the braking start timing has already come. When the spool controller 25 determines that the braking start timing has already come, the processing proceeds from step S12 to step S8. When the spool controller 25 determines that the braking start timing has not come yet, the processing proceeds from step S12 to step S2.

The braking control is performed when the dual-bearing reel 100 is in the casting state, and is not performed when the dual-bearing reel 100 is not in the casting state. Whether the dual-bearing reel 100 is in the casting state can be determined only by detecting high-speed rotation of the spool 12. Hence, detecting the rotational direction of the spool 12 is not required for determining whether the dual-bearing reel 100 is in the casting state. As a result, according to the present preferred embodiment, the spool can be prevented from being braked during a winding of the fishing line with a simple construction at a low cost.

Modification

In the aforementioned preferred embodiment, whether the dual-bearing reel 100 is in the casting state is determined based on the rotational acceleration. However, in the present modification, whether the dual-bearing reel 100 is in the casting state (i.e., whether the spool 12 is not in a fishing line winding state) is determined based on the rotational velocity, and the braking control is performed. Therefore, in the present modification, the rotational acceleration calculator 29 is not used among functional constituent elements shown in FIG. 7.

Figure 10:
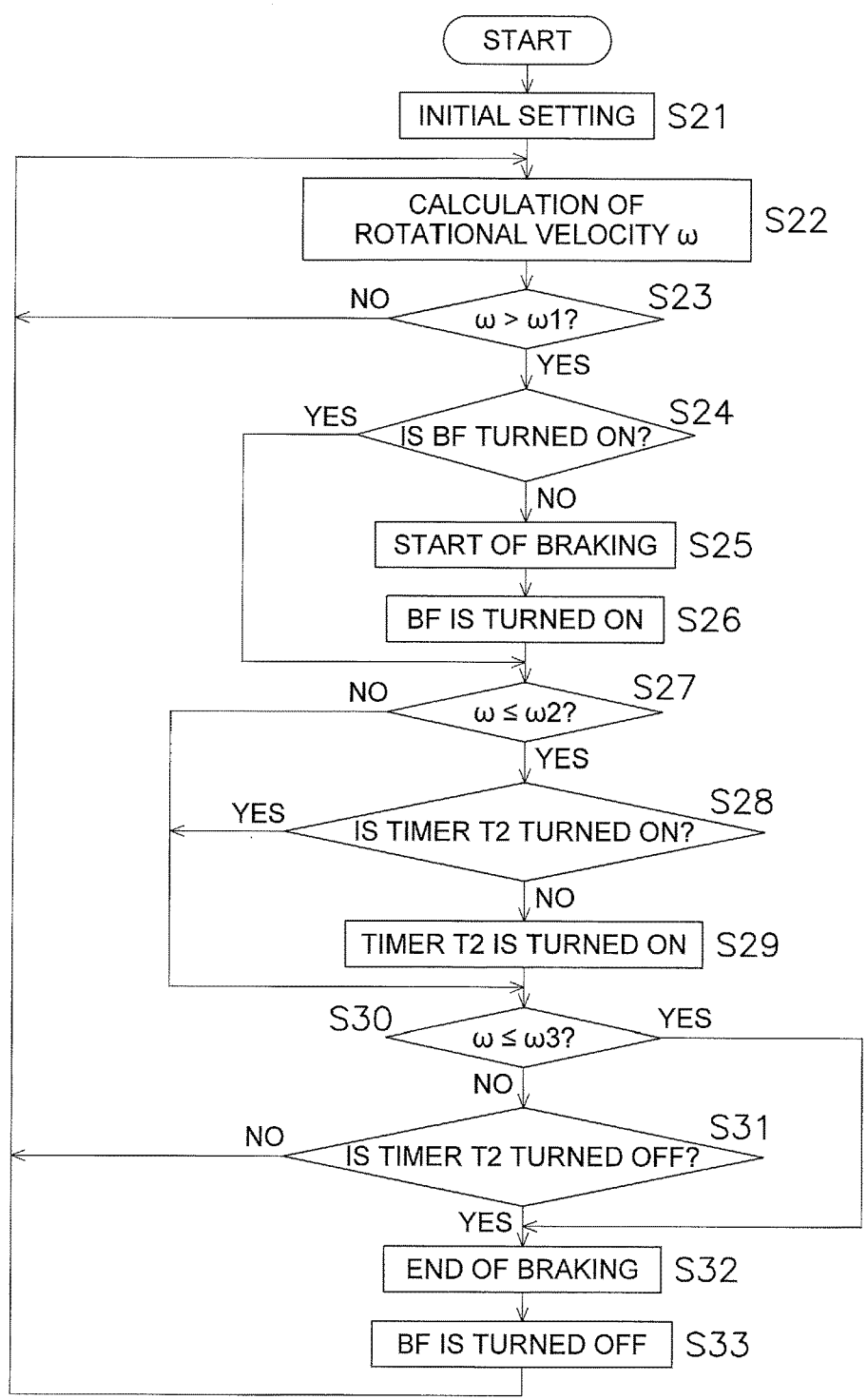
FIG. 10 is a flowchart showing an exemplary algorithm of a brake action of the spool controller according to a modification.

A spool control action according to the present modification will be explained based on a flowchart shown in FIG. 10. It should be noted that the control flowchart shown in FIG. 10 illustrates an exemplary algorithm of a control action, and the control action of the present disclosure is not limited to this.

When the spool 12 is rotated by casting, electric power is stored in the electric storage element 51 and the spool controller 25 is powered on. Then in step S21 of FIG. 10, the spool controller 25 performs an initial setting, and the processing proceeds to step S22. In the initial setting, the spool controller 25 resets a variety of items (flag, timer, data, etc.). In step S22, the spool controller 25 calculates the rotational velocity $\omega$ based on a pulse output from the rotation detector 31. Then, the processing proceeds to step S23. In step S23, the spool controller 25 determines whether the dual-bearing reel 100 is in the casting state, i.e., whether the spool 12 is in the fishing line winding state. Specifically, the spool controller 25 determines whether the calculated rotational velocity $\omega$ has become greater than a first rotational velocity $\omega 1$ (of e.g., 5000 rpm). When the calculated rotational velocity $\omega$ is less than or equal to the first rotational velocity $\omega 1$, the spool controller 25 determines that the dual-bearing reel 100 is not in the casting state, in other words, that the spool 12 is in the fishing line winding state. Then, the processing proceeds to step S22. Thus, when the dual-bearing reel 100 is not in the casting state, the spool controller 25 does not perform the braking control for the spool brake unit 22.

When the rotational velocity $\omega$ has become greater than the first rotational velocity $\omega 1$, the spool controller 25 determines that the dual-bearing reel 100 is in the casting state. Then, the processing proceeds from step S23 to step S24. In step S24, the spool controller 25 determines whether the braking flag BF, indicating that the braking control has been started, has been turned on. In other words, the spool controller 25 determines whether the braking control has been already started.

When the spool controller 25 determines that the spool braking has not been started yet, the processing proceeds from step S24 to step S25. In step S25, the spool controller 25 starts the braking control. Then, the processing proceeds to step S26. In step S26, the spool controller 25 turns on the braking flag BF. Then, the processing proceeds to step S27. On the other hand, when the spool controller 25 determines that the braking control has been already started in step S24, the processing proceeds to step S27.

In step S27, the spool controller 25 determines whether the calculated rotational velocity $\omega$ is less than or equal to a second rotational velocity $\omega 2$ (of e.g., 5000 rpm). The second rotational velocity $\omega 2$ is set for forcibly finishing the braking control while the braking control is being performed. When the spool controller 25 determines that the rotational velocity $\omega$ is less than or equal to the second rotational velocity $\omega 2$, the processing proceeds from step S27 to step S28. When the spool controller 25 determines that the rotational velocity $\omega$ is greater than the second rotational velocity $\omega 2$, the processing proceeds from step S27 to step S30.

In step S28, the spool controller 25 determines whether a timer T2 has been already turned on and has started counting duration that the rotational velocity $\omega$ is less than or equal to the second rotational velocity $\omega 2$. For example, the timer T2 finishes counting in three seconds and turns off. When the spool controller 25 determines that the timer T2 has not been turned on yet, the processing proceeds from step S28 to step S29. In step S29, the spool controller 25 turns on the timer T2 and causes the timer T2 to start counting the duration. Then, the processing proceeds from step S29 to step S30. When the spool controller 25 determines that the timer T2 has been already turned on, the processing proceeds from step S28 to step S30.

In step S30, the spool controller 25 determines whether the calculated rotational velocity ω is less than or equal to a third rotational velocity ω3 (of e.g., 2300 rpm). The third rotational velocity ω3 is set for finishing the braking control. When the spool controller 25 determines that the rotational velocity ω is not less than or equal to the third rotational velocity ω3, the processing proceeds from step S30 to step S31. In step S31, the spool controller 25 determines whether the timer T2 has already finished counting the duration and has been already turned off. When the spool controller 25 determines that the timer T2 has been already turned off, the processing proceeds from step S31 to step S32. In step S32, the spool controller 25 finishes the braking control. Then, the processing proceeds to step S33. In step S33, the spool controller 25 turns off the braking flag BF. Then, the processing proceeds to step S22. Again in step S31, when the spool controller 25 determines that the timer T2 has been kept turned on, the processing proceeds to step S22. Now back to step S30, when the spool controller 25 determines that the rotational velocity ω is less than or equal to the third rotational velocity ω3, the processing proceeds to step S32. Then, the spool controller 25 finishes the braking control. Therefore, when the rotational velocity ω becomes less than or equal to the third rotational velocity ω3, the braking control is finished regardless of the on/off state of the timer T2.

In the present modification, the rotation detector 31 cannot detect the rotational direction of the spool 12 by itself. Hence, the braking control is finished not only when the rotational velocity ω is less than or equal to the third rotational velocity ω3 but also when the rotational velocity ω continuously becomes less than or equal to the second rotational velocity ω2, which is faster than the third rotational velocity ω3, for a predetermined period of time (e.g., three seconds). The reason for thus finishing the braking control is as follows. For example, when a predetermined rotational phase of the brake magnet 44 is close to the rotation detector 31 in establishing a clutch-on state by rotating the handle 2, the spool controller 25 determines that the rotational velocity ω of the spool 12 is greater than the third rotational velocity ω3 even if the rotational velocity ω is actually less than or equal to the third rotational velocity ω3. Thus, the spool controller 25 does not perform a processing step of finishing the braking control.

Thus in the present modification, when the rotational velocity ω becomes greater than the first rotational velocity ω1, the spool controller 25 determines that the dual-bearing reel 100 is in the casting state and starts the braking control. On the other hand, when the rotational velocity ω decreases to the third rotational velocity ω3 or less, the spool controller 25 finishes the braking control. Moreover, during the braking control, when the rotational velocity ω becomes less than or equal to the second rotational velocity ω2 and three seconds elapses in this condition, the spool controller 25 forcibly stops the braking control.

Other Preferred Embodiments

One preferred embodiment of the present disclosure has been explained above. However, the present disclosure is not limited to the above, and a variety of changes can be made without departing from the scope of the present disclosure. Especially, a plurality of embodiments and modifications described in the present specification can be arbitrarily combined on an as-needed basis.

(a) The aforementioned preferred embodiment and modification have described the spool brake unit 22 braking the spool 12 by electric power generation. However, the spool brake unit can be arbitrarily constructed so long as it is electrically controllable. For example, the spool brake unit can have a construction that an electrically controllable actuator causes brake shoes or brake pads to make contact with a drum or a disc.

(b) In the aforementioned preferred embodiment, the braking start time is predicted based on the rotational acceleration. In the present disclosure, the basis for predicting the braking start time is not limited to this. The braking start time can be predicted based on the rotational velocity.

(c) In the aforementioned preferred embodiment, the dual-bearing reel 100 has been exemplified as a fishing reel of the present disclosure. However, the fishing reel of the present disclosure is not limited to this. Any suitable fishing reel can be employed as long as it brakes a spool in an electrically controllable manner. For example, the present disclosure is applicable to single bearing reels or electric reels.

Features

The aforementioned preferred embodiment can be expressed as follows.

(A) The spool brake mechanism 20 can brake the spool 12 of the dual-bearing reel 100. The spool brake mechanism 20 includes the spool brake unit 22, the rotation detector 31, the rotational velocity calculator 28, the casting state determiner 30 and the controller 35. The spool brake unit 22 brakes the spool 12 in an electrically controllable manner. The rotation detector 31 detects the rotation of the spool 12. The rotational velocity calculator 28 calculates the rotational velocity ω of the spool 12 based on a detected result output from the rotation detector 31. The casting state determiner 30 is configured to determine whether the dual-bearing reel 100 is in the casting state based on a calculated result by the rotational velocity calculator 28. The controller 35 controls the spool brake unit 22 to brake the spool 12 when the casting state determiner 30 determines that the dual-bearing reel 100 is in the casting state, and controls the spool brake unit 22 to not brake the spool 12 when the casting state determiner 30 determines that the dual-bearing reel 100 is not in the casting state.

The spool brake mechanism 20 does not necessarily detect the rotational direction of the spool 12, and can be configured to determine whether the dual-bearing reel 100 is in the casting state, not based on the rotational direction of the spool 12, but based on the rotational velocity of the spool 12. Additionally, the controller 35 is controls the spool brake unit 22 to brake the spool 12 when the dual-bearing reel 100 is in the casting state, and controls the spool brake unit 22 to not brake the spool 12 when the dual-bearing reel 100 is not in the casting state, such as when the fishing reel is in a fishing line winding state. Here, the casting state can be detected based on the rotational velocity of the spool 12. Hence, the casting state can be detected using only the single rotation detector 31. Accordingly, braking of the spool 12 can be prevented during a winding of the fishing line with a simple construction at low cost.

(B) The rotation detector 31 can include one hall element 31a that can output a signal when detecting the brake magnet 44 (i.e., detection target) provided on the spool 12. According to the aforementioned construction, the casting state can be detected based on the rotational velocity ω calculated based on the detected result output from the rotation detector 31 having the single hall element 31a. Hence, braking of the spool 12 can be prevented during a winding of the fishing line with a simpler construction at a lower cost.

(C) The spool brake mechanism 20 for the dual-bearing reel 100 can further include the rotational acceleration calculator 29. The rotational acceleration calculator 29 can calculate the rotational acceleration ωa of the spool 12 based on the detected result by the rotation detector 31. The casting state determiner 30 can determine that the dual-bearing reel 100 is in the casting state when the rotational acceleration ωa calculated by the rotational acceleration calculator 29 becomes greater than the first rotational acceleration ωa1. According to the aforementioned construction, whether the dual-bearing reel 100 is in the casting state can be determined based on the rotational acceleration ωa of the spool 12 obtained based on the detected result of the rotation detector 31. Hence, whether the dual-bearing reel 100 is in the casting state can be accurately determined.

(D) The controller 35 can set the predicted start time t2 and perform a braking control for the spool brake unit 22 at the braking start time t3 predicted based on the predicted start time t2. The predicted start time t2 can be set based on the time t1 at which the rotational acceleration ωa, calculated by the rotational acceleration calculator 29, becomes less than or equal to the second rotational acceleration ωa2 greater than the first rotational acceleration ωa1, after the rotational acceleration ωa calculated by the rotational acceleration calculator 29 is maximized as the maximum rotational acceleration ωamax. According to the aforementioned configuration, braking of the spool 12 can be started using the rotational acceleration ωa of the spool 12 which is less likely to fluctuate at around the maximum value than the rotational velocity ω of the spool. Hence, the spool 12 can be braked at an appropriate timing. Additionally, the predicted start time t2 is set before braking of the spool 12 is started, and the braking start time t3 of the spool 12 is predicted based on the predicted start time t2. Hence, braking of the spool 12 can be reliably started at a good timing.

(E) The spool brake mechanism 20 for the dual-bearing reel 100 can further include the braking duration setter 33 that can set the braking duration tb from the braking start time t3 until the braking control is finished. The casting state determiner 30 can determine that the dual-bearing reel 100 is not in the casting state when the braking duration tb has elapsed from the braking start time t3 and simultaneously the rotation of the spool 12 has been detected based on the detected result output from the rotation detector 31. According to the aforementioned configuration, ending of the casting state can be determined. Hence, the spool 12 can be prevented from being braked during a winding of the fishing line after an ending of a casting.

(F) The spool brake mechanism 20 for the dual-bearing reel 100 can further include the rotational velocity calculator 28 that can calculate the rotational velocity ω of the spool 12 based on the detected result by the rotation detector 31. The casting state determiner 30 determines that the dual-bearing reel 100 is in the casting state when the rotational velocity ω calculated by the rotational velocity calculator 28 becomes greater than the first rotational velocity ω1. According to the aforementioned construction and configuration, the rotational velocity ω can be easily detected. Hence, whether the dual-bearing reel 100 is in the casting state can be quickly determined.

(G) The spool brake unit 22 can include the brake magnet 44 and the plural coils 46. The brake magnet 44 unitarily rotates with the spool 12 and has a plurality of magnetic poles aligned in the circumferential direction. The plural coils 46 are disposed at intervals away from the outer peripheral side of the brake magnet 44. The detection target can be the brake magnet. The sensor can be the hall element 31a configured to detect passage of the magnetic poles of the brake magnet 44. According to the aforementioned construction, the casting state can be detected in a contactless manner by the low-cost magnetic sensor (e.g., a reed switch, the hall element 31a, etc.) configured to only detect passage of the magnetic poles of the brake magnet 44.

(H) The detection target can be a light reflective member provided on the spool 12. The sensor can be a photosensor configured to irradiate a light to the spool 12 and be turned on by the light reflected by the light reflective member. According to the aforementioned construction, the casting state is detectable in a contactless manner by the low-cost photosensor (e.g., photoelectric element) configured to be only turned on and off by a light.

What is claimed is:

1. A spool brake device for a fishing reel, the spool brake device configured to brake a spool of the fishing reel, the spool brake device comprising:
   a spool brake configured to brake the spool in an electrically controllable manner;
   a rotation detector configured to detect a rotation of the spool; and
   a controller configured
      to calculate a rotational velocity of the spool based on the rotation of the spool,
      to determine whether the fishing reel is in a casting state based on the rotational velocity,
      to control the spool brake to brake the spool upon a determination that the fishing reel is in the casting state, and
      to control the spool brake to not brake the spool upon a determination that the fishing reel is not in the casting state.

2. The spool brake device according to claim 1, wherein the rotation detector includes a sensor, the sensor configured to output a signal to the controller upon detecting a detection target provided on the spool.

3. The spool brake device according to claim 2, wherein the spool brake includes a brake magnet and a plurality of coils, the brake magnet rotatable unitarily with the spool, the brake magnet having a plurality of magnetic poles aligned in a circumferential direction, the plurality of coils disposed away from an outer periphery of the brake magnet at intervals,
   the detection target is the brake magnet, and
   the sensor is a magnetic sensor configured to be turned on and off by rotation of the brake magnet.

4. The spool brake device for a fishing reel according claim 2, wherein
   the detection target is a light reflective member on the spool, and
   the sensor is a photosensor configured to irradiate a light to the spool and be turned on by the light reflected by the light reflective member.

5. The spool brake device according to claim 1, wherein the controller is further configured
   to calculate a rotational acceleration of the spool based on the rotation of the spool, and
   to determine that the fishing reel is in the casting state upon a determination that the rotational acceleration is greater than a first rotational acceleration.

6. The spool brake device according to claim 5, wherein the controller is further configured to set a predicted start time and start a braking control for the spool brake to start braking the spool at a braking start time, the braking start time determined based on the predicted start time, the predicted start time set based on a point of time at which the rotational acceleration becomes less than or equal to a second rotational acceleration, the second rotational acceleration greater than the first rotational acceleration, the braking start time being after a time the rotational acceleration has reached a maximum rotational acceleration.

7. The spool brake device according to claim 6, wherein the controller is further configured to set a braking duration, the braking duration lasting from the braking start time until the braking control is finished, and to determine that the fishing reel is not in the casting state upon a determination that the rotation of the spool has occurred after the braking duration has elapsed.

8. The spool brake device according to claim 1, wherein the controller is further configured to calculate the rotational velocity of the spool based on the rotation of the spool detected by the rotation detector, and to determine that the fishing reel is in the casting state upon a determination that the rotational velocity is greater than a first rotational velocity.

9. A method for controlling a spool brake device of a fishing reel, the method comprising:

calculating a rotational velocity of a spool;

determining whether the fishing reel is in a casting state based on the rotational velocity;

controlling the spool brake to brake the spool upon a determination that the fishing reel is in the casting state; and controlling the spool brake to not brake the spool upon a determination that the fishing reel is not in the casting state.

10. The method according to claim 9, further comprising:
calculating a rotational acceleration of the spool; and
determining that the fishing reel is in the casting state upon a determination that the rotational acceleration is greater than a first rotational acceleration.

11. The method according to claim 10, further comprising:

setting a predicted start time; and controlling the spool brake to start braking the spool at a braking start time, the braking start time determined based on the predicted start time, the predicted start time set based on a point of time at which the rotational acceleration becomes less than or equal to a second rotational acceleration, the second rotational acceleration greater than the first rotational acceleration, the braking start time being after a time the rotational acceleration has reached a maximum rotational acceleration.

12. The method according to claim 11, further comprising:

setting a braking duration, the braking duration lasting from the braking start time until the braking control is finished; and determining that the fishing reel is not in the casting state upon a detection that a rotation of the spool has occurred after the braking duration has elapsed.

13. The method according to claim 9, further comprising:
determining that the fishing reel is in the casting state upon a determination that the rotational velocity of the spool is greater than a first rotational velocity.

14. The method according to claim 13, further comprising:

starting a timer upon starting a braking and determining that the rotational velocity of the spool is less than or equal to a second rotational velocity.

15. The method according to claim 14, further comprising:

ending the braking upon turning the timer off after a braking duration has elapsed and the rotational velocity of the spool is less than or equal to a third rotational velocity.

16. A spool brake device for a fishing reel, the spool brake device to brake a spool of the fishing reel, the spool brake device comprising:

an electric spool brake;

rotation detecting means for detecting a rotation of the spool; and spool brake controlling means for calculating a rotational velocity based on a signal from the rotation detecting means, for determining whether the fishing reel is in a casting state based on the rotational velocity, for controlling the spool brake to brake the spool upon a determination that the fishing reel is in the casting state, and for controlling the spool brake to not brake the spool upon a determination that the fishing reel is not in the casting state.

17. The spool brake device of claim 16, wherein the spool brake controlling means calculates a rotational acceleration based on the signal from the rotation detecting means, and determines whether the fishing reel is in the casting state based on the rotational acceleration.

18. The spool brake device of claim 16, wherein the spool brake controlling means sets a braking duration based on the rotational velocity, and controls the spool brake to brake the spool based on the braking duration.

19. The spool brake device of claim 16, wherein the spool brake controlling means calculates a tension based on the rotational velocity, and changes a braking force according to the tension.

20. The spool brake device of claim 16, further comprising:

selection detecting means for detecting a selection, wherein the controlling means further controls the spool brake based on the selection.

* * * * *